(12) United States Patent
Boothby

(10) Patent No.: US 7,567,113 B2
(45) Date of Patent: Jul. 28, 2009

(54) METHOD FOR REDUCING THE NUMBER OF PINS REQUIRED FOR AN INTERFACE TO AN ELECTRONIC DEVICE AND DEVICES USING THE METHOD

(75) Inventor: Philip Boothby, Boulder, CO (US)

(73) Assignee: Kyocera Wireless Corp., San Diego, CA (US)

( * ) Notice: Subject to any disclaimer, the term of this patent is extended or adjusted under 35 U.S.C. 154(b) by 306 days.

(21) Appl. No.: 11/145,113

(22) Filed: Jun. 3, 2005

(65) Prior Publication Data

US 2006/0292995 A1  Dec. 28, 2006

(51) Int. Cl.
*H03K 17/687* (2006.01)
(52) U.S. Cl. .................................. 327/427; 381/107
(58) Field of Classification Search .................. 327/419, 327/427, 434
See application file for complete search history.

(56) References Cited

U.S. PATENT DOCUMENTS 6,411,717 B1 * 6/2002 Lubbe et al. .................. 381/98
7,102,414 B2 * 9/2006 Lin .............................. 327/419
7,102,415 B1 * 9/2006 Potanin et al. ............... 327/427
7,324,167 B2 * 1/2008 Miller ......................... 348/723
2004/0095182 A1 * 5/2004 Tomari et al. ................ 327/417

FOREIGN PATENT DOCUMENTS

JP     2002299973 A   * 10/2002

* cited by examiner

*Primary Examiner*—Quan Tra

(57) ABSTRACT

A single signal trace can be multiplexed between a circuit that provides a reference voltage and another circuit that is not operational while the reference voltage is needed. Fewer signal connections will be needed due to the multiplexing. As one possible example, a clock signal that is used at initial power up of an electrical circuit can later be used as a reference voltage. In one specific example, a signal line is connected from one electronic device to a second electronic device. The signal line is connected to a clock input of a circuit and an input to an amplifier. When the devices first power up a clock signal is active on the signal line and is used to the clock input. When the clock signal is no longer needed the signal can be used to drive the amplifier to create a reference voltage.

16 Claims, 2 Drawing Sheets

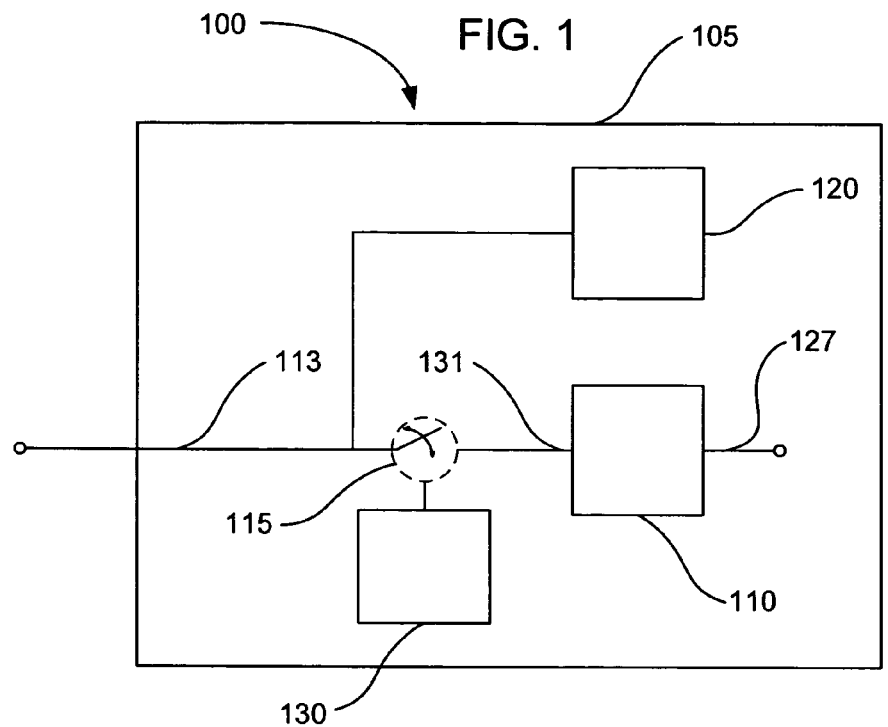
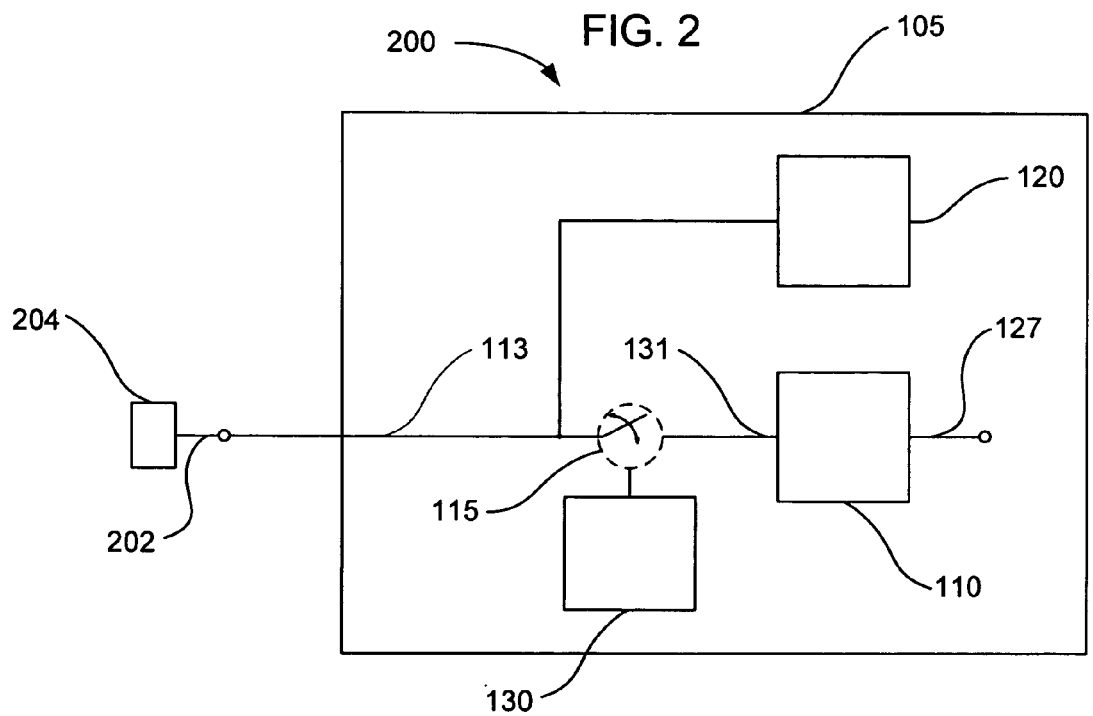

METHOD FOR REDUCING THE NUMBER OF PINS REQUIRED FOR AN INTERFACE TO AN ELECTRONIC DEVICE AND DEVICES USING THE METHOD

1. FIELD

The invention generally relates to electronic devices and more particularly relates to interconnections between electronic devices.

2. BACKGROUND

Electronic devices have become almost ubiquitous in many parts of the world. Computers, televisions, and stereos are common in many areas. Additionally, mobile electronic devices are also becoming more common, including portable computers, portable stereos, and portable televisions. Mobile handsets, sometimes referred to as mobile phones are another example of the multitude of different electronic devices available.

Many electronic devices have other external electronic devices attached to them. One example is a mobile wireless device with a hands-free car kit attached. A hands-free car kit is a device that allows a mobile handset user to talk during a mobile call without having to hold the mobile handset near the user's head.

When connecting one electronic device to another, in many cases, is advantageous to minimize the number of connections between the devices. To illustrate, an example of a mobile handset and a hands-free car kit will be discussed, however, it will be clear that other examples are possible. Many mobile electronic devices can benefit by decreasing the number of connections between each mobile electronic device. Additionally, other examples of electronic devices that are not portable are possible.

Now, returning to the specific example, a mobile handset and a hands-free car kit is described. As stated above, the cost of connectors can, in some cases increase when the number of connections increases. Additionally, connectors with more connections are typically larger than a similarly constructed connector with fewer pins. For these reasons it may generally be advantageous to decrease the number of connections between two electronic devices.

Another problem with electronic devices is that in some cases noise can be caused by the amount of current that flows between two devices. The current flow is in some cases variable. This variable current can cause signal levels in the devices to vary. As a specific example, when one device provides power to a second device the voltage level of a ground reference may vary due to the changing current in the conductor connecting the two devices. In many cases noise can adversely effect the performance of electronic devices. One specific example is when a signal is an audio signal. Noise coupled onto an audio signal can be readily apparent to the user of an electronic device in many cases. Specifically, when the noise coupled to an audio signal creates audible noise to output from a speaker, the noise adversely effects the performance of the mobile handset for the user.

It would generally be advantageous to find a way to lower the signal count on the connectors of an electronic device. It would also generally be advantageous to limit noise coupling onto signal lines. Generally, limiting noise coupling onto signal lines while also lowering signal count may lower cost and improve the performance of electronic devices.

3. SUMMARY

In some cases electronic devices are connected to other electronic devices. In some cases the two electronic devices may be a mobile handset and a hands-free car kit or other mobile handset accessory. Other examples are possible, for example, the two electronic devices may be a computer and an external computer peripheral. In many cases the number of connections between the two electronic devices is limited. The expense associated with the connectors and cable used to connect the two devices may increase as the number of electrical connections increases. Additionally, the size of the connector may increase as the number of connections increases. Alternatively, connectors may be similar in size, but one with more connections may tend to be more expensive, or harder to manufacture. In many cases, a way of multiplexing multiple signals on a single conductor would tend to be advantageous. Note that the above examples, are only intended to be examples, other examples are possible. Other reasons may exist for multiplexing multiple signals on a single conductor.

Some electronic devices, such as mobile telephone handsets and mobile telephone handset peripherals may include audio signals. In some cases audio signals may be especially susceptible to noise. The noise may be audible to the user. Typically, users of electronic devices, such as mobile telephone handsets do not like to hear noise. Noise tends to interfere with telephone conversation. It would be advantageous to decrease noise in electrical circuits, especially, in some cases, electrical circuits that contain audio.

If a single signal trace is multiplexed between a circuit that provides a reference voltage and another circuit that is not operational while the reference voltage is needed fewer signal connections will be needed. As one possible example, a clock signal that is used at initial power up of an electrical circuit can later be used as a reference voltage. In one specific example, a signal line is connected from one electronic device to a second electronic device. The signal line is connected to a clock input of a circuit and an input to an amplifier. When the devices first powers up a clock signal is active on the signal line and is used to drive the clock input. When the clock signal is no longer needed the signal can be used to drive the amplifier to create a reference voltage.

Advantages may in some cases include lowering pin count on connectors used to connect two electronic devices. The size of a connector may also be reduced, additionally, in some cases, the cost of the connector may be reduced. Other advantages may include lower noise in an electrical circuit. Additionally, this may lead to lower noise in an audio circuit. Not all advantages, however, will occur in every implementation. As an example, in an electronic device that does not have audio, lowering audio noise would not be an advantage for that device. The device may have other advantages either related to noise reduction in an electrical circuit, or not related to noise reduction.

Generally, as would typically be the case with the mobile handset example, one device will often be contained within one case, and the accessory will often be contained in another case. In this example, typically a cable connects the two devices and the number of connections between the device can be lowered by using the method. It will be clear, however, that the method could be applied to other examples. As an additional example, the method could be used to limit the number of connections in a set of connectors between multiple boards in an electronic device. The method could also be used to limit the number of signal traces on a printed wire board.

The method and devices multiplex multiple signals on a single signal line. In a specific example, an audio reference is generated by multiplexing an external voltage and a clock signal into a digital interface that does not have a usable, clean common reference signal. In the specific example the audio is muted when the digital communication occurs.

4. BRIEF DESCRIPTION OF THE DRAWINGS

FIG. 1 is a diagram, showing a mobile communication device accessory

FIG. 2 is a diagram showing a mobile communication device connected to a mobile communication device accessory.

5. DETAILED DESCRIPTION

Figure 3:
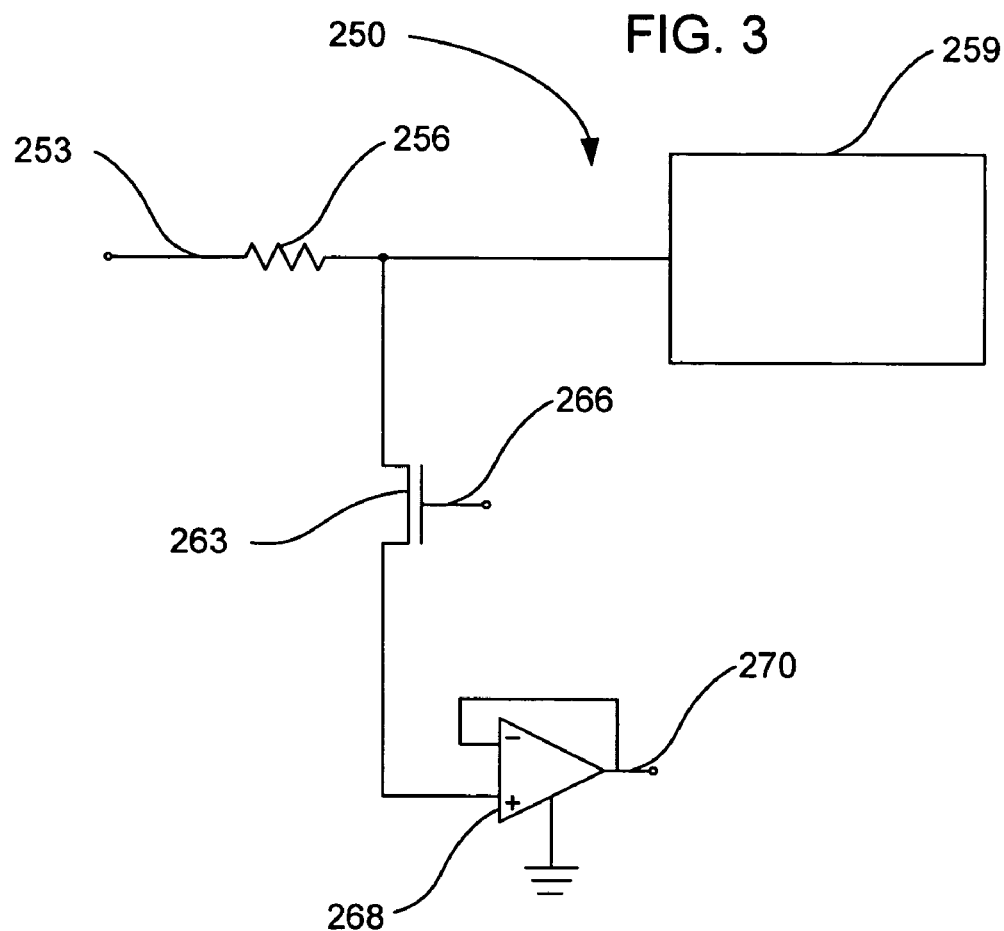
FIG. 3 is an example of a mobile communication device accessory.

Referring now to FIG. 1, a diagram of a mobile communication device accessory 100 is shown. The mobile communication device accessory includes a case 105. The case is shown enclosing several other components. It will be clear that this is only one possible example. The actual components that are enclosed in the case in any particular implementation may vary, and the scope should only be limited by the claims.

Referring back to FIG. 1, the case 105 has, as an input, a signal line 113. The signal line 113 is connected, through a switch 115 to a first circuit 110 and to a second circuit 120. The switch 115 allows the signal line to be connected and disconnected from the first circuit 110. Additionally, the signal line 113 provides an input voltage 131 to the first circuit 110 when the switch is closed.

The first circuit 110 outputs a reference voltage 127 that is typically a function of the input voltage 131. The reference voltage is in many cases used within the mobile communication device and may be the same, or similar in voltage level to a ground line. In many cases, the first circuit is a high impedance follower circuit.

A switch control 130 is used to control the connection between the signal line 113 and the first circuit. It will be clear that in some cases, the diagram shown in FIG. 1 may be a simplified version. Other implementations are possible. Again, the scope should only be limited by the claims. An advantage in some cases, may be the ability to use a single signal line to drive multiple circuits. FIG. 1 shows an example of a mobile communication device, however, this is only one possible example. The device could be any electronic device accessory. It will also be clear that an electronic device accessory is typically an electronic device.

An advantage is that the reference voltage 127 shown in FIG. 1 may tend to be less noisy than a reference voltage that is supplied directly from an external mobile communication device, or other external electronic device. The first circuit is typically a high impedance, low current device. For this reason, the noise on the signal line 113 would typically be low. Additionally, the reference voltage output from the first circuit 110 would typically be near the circuitry using the reference voltage, lowering the noise generated by currents flowing over long signal paths. It should, however, be noted that this is only a generalization, and may not apply to all implementations.

FIG. 2 is a diagram 200 showing a mobile communication device 204 connected the mobile communication device accessory 100 of FIG. 1. The diagram 200 shows one possible implementation. Other implementations are possible. The signal line 113 couples an external voltage 202 from the mobile communication device to the mobile communication device accessory 100 of FIG. 1.

Again, while a mobile communication device 204 and a mobile communication device accessory 100 are shown, it will be clear that other combinations of electronic devices are possible. As FIG. 2 illustrates, by using a single signal line 113, multiple circuits 110, 120 can be driven.

In some cases only one circuit is driven at a time. For example, the second circuit 120 may be a digital circuit that requires a clock. In this example, the digital circuit is only required to operate when the device first powers up. Additionally, the first circuit 110 may provide a ground reference for analog circuitry that is only used after the device first powers up and the digital circuitry is no longer needed.

As a more specific example, suppose that the mobile communication device accessory 100 is a hands free car kit. A hands free car kit is a device that connects to a mobile telephone handset and allows a user to conduct a mobile telephone call while minimizing the user's interaction with the mobile telephone handset. For example, hands free car kits typically contain a microphone that picks up the users voice without requiring the user to hold the microphone near the users mouth. In some forms the microphone may be held near the users mouth by a clip, however, in other forms the microphone may be constructed so that it is not required to be near the users mouth.

The hands free car kit may contain a memory device. The second circuit 120 may be that memory device. The memory device contains information that is clocked out of the device during a first time period, typically the initial stage of powering up. After the information has been clocked out of the memory device, the clock signal is no longer needed, and the functionality of the memory device is no longer needed. During this second time period the line that the clock signal was on may be used for other purposes.

As an example, the hands free car kit may contain a speaker that allows the user to hear a mobile telephone call. The sound quality of the sound that comes from the speaker and the circuitry that drives the speaker may be improved if a clean reference voltage is provided to the speaker and circuitry. After the memory device is no longer needed, the clock signal can be driven to a low voltage and used as an input to the first circuit 110. The first circuit 110 can be used to provide a reference voltage 127 to the speaker and the circuitry that drives the speaker.

This is only one possible example. It is intended to illustrate one possible use for some of the embodiments described in this application. Other embodiments are possible.

FIG. 3 is an example of a mobile communication device accessory 250. The mobile communication device is similar to the mobile communication device 100 described with respect to FIGS. 1 and 2. The mobile communication device 250 includes a signal line 253. The signal line 253 is the same or similar to the signal line 113 of FIGS. 1 and 2. The signal line 253 is coupled to other circuitry through a resistor 256. The resistor 256 may not be used in every implementation. It will be clear, however, that most signal lines have some resistance. Note resistor was not shown in FIGS. 1 and 2. Recall that FIGS. 1 and 2 are intended to generally detail a possible implementation and that other implementations are possible. The scope should only be limited by the claims.

A switch in the form of a transistor 263 is shown on FIG. 3. The transistor 263 is one possible implementation of the switch 115 shown on FIGS. 1 and 2. The transistor is controlled by a signal 266 that is connected to the switch control. The switch control is not shown in FIG. 3, however, it is the same or similar to the switch control 130 of FIGS. 1 and 2.

An amplifier, in the form of an operational amplifier 268 is shown in FIG. 3. The operational amplifier is shown as a "follower" circuit. The "follower" circuit tends to output a signal that closely follows the voltage on signal line 253. This is intended to be a general statement regarding the typically functioning of a "follower" circuit. It will be clear that in some cases the "follower" circuit may not output a voltage that is close to the input voltage.

As shown in FIG. 3 the operational amplifier 268 circuit will typically be provided an input near ground. The input is provided through the transistor 263. The operation amplifier 268 will typically output a voltage that is near ground and can be used as a reference voltage 270. The reference voltage 270 is the same or similar to the reference voltage 127 of FIGS. 1 and 2. Additionally, the operational amplifier is one possible implementation of the first circuit 110 of FIGS. 1 and 2. A second circuit 259 is shown on FIG. 3. The second circuit 259 is the same or similar to the second circuit 120 of FIGS. 1 and 2. FIG. 3 is intended to show one possible implementation. Other implementations are possible.

Figure 4:
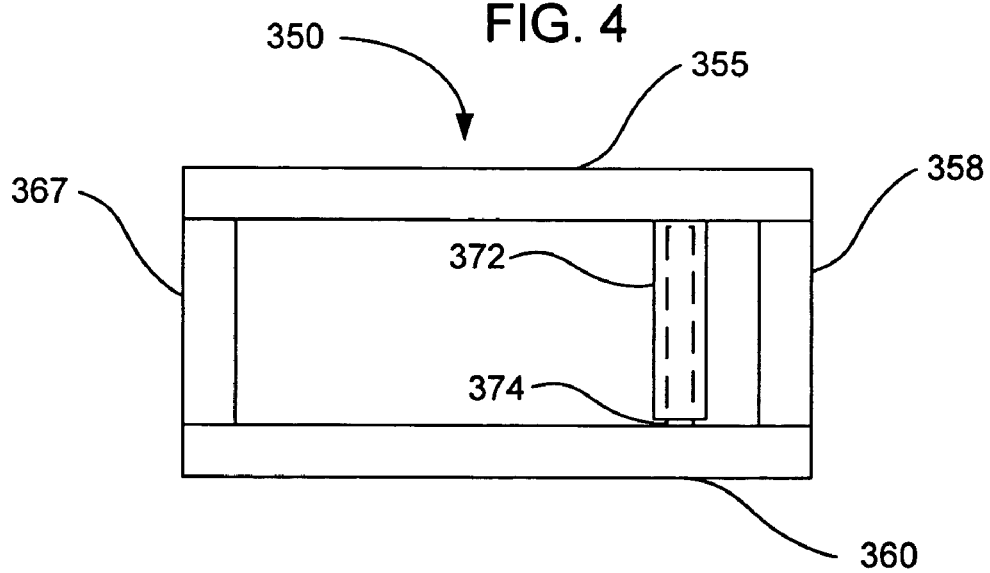
FIG. 4 is an example of two circuit boards stacked together implementing an embodiment.

Referring now to FIG. 4, another example will be discussed. In this example a connection is made between two circuit boards. In the examples discussed with respect to FIGS. 1, 2, and 3 a connection is typically made between two circuit boards. In these examples the signal line 113 is used to make the connection. Similarly, connections are made between two circuit boards 355, 360 in FIG. 4.

FIG. 4 is a diagram 350 that depicts two circuit boards 355, 360 stacked together. The two circuit boards 355, 360 are mechanically connected to two metal pieces 358, 367 that position the circuit boards 355, 360 relative to each other. This is only one possible mechanical assembly. In many cases no metal pieces 358, 367 are required. Additionally, in some cases the metal pieces 358, 367 may be made of a material other than metal. The example is only intended to be illustrative. The circuits described may be used in many different devices and mechanical assemblies. For example, while two circuit boards 355, 360 are shown in FIG. 4, additional circuit boards are possible.

FIG. 4 includes two connectors 372, 374. The connectors connect electrical signal traces from the top circuit board 355 to the bottom circuit board 360. The connectors 355, 360 may typically connect multiple signal traces, however, in some cases, a single signal trace may be connected by the connectors 272, 374. In many cases, the size of the connectors 372, 374 may be limited, and the number of electrical connections may be limited. One advantage is that two different signals, for example, as discussed above, a clock and a ground reference are multiplexed and only require a single electrical connection.

It will be understood that the same or similar circuits discussed with respect to FIGS. 1, 2, and 3 are placed on the circuit boards 355, 360. The circuits may be similar in form, function, or both. Typically, one circuit board 355 will have the circuit discussed with respect to the mobile communication accessory 100 of FIG. 2 and the other circuit board 360 will have the circuit discussed with respect to the mobile communication device 204. It will also be understood that the placement of the circuits on the top or bottom board could be swapped. Additionally, as stated above, more than two boards are possible.

Several examples have been discussed, however, as stated above, these are only possible examples, other examples will occur to one of skill in the art. The scope should only be limited by the claims. Electrical circuits can be designed in many different forms and still perform the same or similar function. Additionally, electrical circuits that are initially used in one specific device or devices can, in many cases, be used in many different devices. In different specific implementations the same or similar circuits may have the same advantages, however, a circuit may not have every advantage discussed in every implementation.

I claim:

1. A method of connecting a first electronic device to a second electronic device, the second electronic device including a first circuit and a second circuit, comprising the steps of:

connecting the first electronic device to the second electronic device using at least a conductor;

providing, using the conductor, a clock signal from the first electronic device to the second electronic device to clock information out of the second circuit of the second electronic device during a first time period when second electronic device first powers up, wherein the second circuit is a memory circuit and wherein the first circuit is electrically decoupled from the conductor during the first time period thereby rendering the first circuit incapable of receiving the clock signal during the first time period;

electrically coupling, using a switch, the first circuit of the second electronic device to the conductor during a second time period that is after the first time period; and providing, using the conductor during the second time period, an external voltage different from the clock signal from the first electronic device to the first circuit of the second electronic device to cause the first circuit to output a reference voltage, wherein the clock signal represents a periodic clock signal and the external voltage represents a non-periodic signal that is different from the clock signal.

2. The method of claim 1 wherein the first electronic device is a mobile communication device.

3. The method of claim 1 wherein the second electronic device is a mobile communication device accessory.

4. The method of claim 1 wherein the second circuit represents a memory device.

5. The method of claim 1 wherein the first circuit includes an amplifier.

6. The method of claim 1 wherein the reference voltage is employed by an analog circuit to drive a speaker.

7. The method of claim 6 wherein the reference voltage is an audio reference.

8. The method of claim 7 wherein an audio signal is muted when the first circuit is electrically decoupled from the conductor.

9. A method for providing a clock signal and an external voltage different from the clock signal to a mobile communication device accessory, wherein the mobile communication device accessory is configured to be coupled with a mobile communication device, the mobile communication device configured for the providing of the clock signal and the external voltage, the method comprising:

connecting the mobile communication device to the mobile communication device accessory using at least a conductor, wherein the mobile communication device accessory includes a first circuit and a second circuit;

providing, using the conductor, the clock signal from the mobile communication device to the mobile communication device accessory to clock information out of the second circuit of the mobile communication device accessory during a first time period when mobile communication device accessory first powers up, wherein the second circuit is a memory circuit and wherein the first circuit is electrically decoupled from the conductor during the first time period thereby rendering the first circuit incapable of receiving the clock signal during the first time period;

electrically coupling, using a switch, the first circuit of the mobile communication device accessory to the conductor during a second time period that is after the first time period; and providing, using the conductor during the second time period, the external voltage different from the clock signal from the mobile communication device to the first circuit of the mobile communication device accessory to cause the first circuit to output a reference voltage responsive to receiving the external voltage, wherein the clock signal represents a periodic clock signal and the external voltage represents a non-periodic signal that is different from the clock signal.

10. The method of claim 9 wherein the second circuit represents a memory device.

11. The method of claim 9 wherein the first circuit includes an amplifier.

12. The method of claim 10 wherein the amplifier is an operational amplifier.

13. The method of claim 12 wherein the operational amplifier is configured as a follower circuit.

14. The method of claim 9 wherein the reference voltage is employed by an analog circuit to drive a speaker.

15. The method of claim 14 wherein the reference voltage is an audio reference.

16. The method of claim 15 wherein an audio signal is muted when the first circuit is electrically decoupled from the conductor.

* * * * *